US012614321B2

(12) United States Patent
Shoji et al.

(10) Patent No.: US 12,614,321 B2
(45) Date of Patent: Apr. 28, 2026

(54) INFORMATION PROCESSING DEVICE, INFORMATION PROCESSING METHOD, AND NON-TRANSITORY COMPUTER-READABLE STORAGE MEDIUM FOR MEASURED AND UNKNOWN MATERIAL

(71) Applicant: TOYOTA JIDOSHA KABUSHIKI KAISHA, Toyota (JP)

(72) Inventors: Tetsuya Shoji, Susono (JP); Masao Yano, Sunto-gun (JP); Ryota Haru, Numazu (JP); Ryo Aoki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 360 days.

(21) Appl. No.: 18/377,492

(22) Filed: Oct. 6, 2023

(65) Prior Publication Data

US 2024/0169616 A1 May 23, 2024

(30) Foreign Application Priority Data

Nov. 17, 2022 (JP) ................................. 2022-184420

(51) Int. Cl.
*G06T 11/26* (2026.01)
*G01N 21/27* (2006.01)

(52) U.S. Cl.
CPC .............. *G06T 11/26* (2026.01); *G01N 21/27* (2013.01); *G01N 2201/126* (2013.01)

(58) Field of Classification Search
CPC .................................................... G06T 11/206
See application file for complete search history.

(56) References Cited

U.S. PATENT DOCUMENTS 6,075,891 A * 6/2000 Burman ................. G06V 20/13
382/190
2012/0134582 A1 5/2012 Treado et al.
2019/0017871 A1 * 1/2019 Choi ......................... G01J 3/28
(Continued)

FOREIGN PATENT DOCUMENTS

JP 2020-176951 A 10/2020

OTHER PUBLICATIONS

Espadoto, Mateus et al., "UnProjection: Leveraging Inverse-Projections for Visual Analytics of High-Dimensional Data", Nov. 2, 2021, https://doi.org/10.48550/arXiv.2111.01744 (Year: 2021).*
(Continued)

*Primary Examiner* — Michelle L Sams
(74) *Attorney, Agent, or Firm* — Sughrue Mion, PLLC

(57) ABSTRACT

An information processing device includes a non-transitory memory and a processor coupled to the non-transitory memory. The processor is configured to: set respective spectral data measured from each of plural materials as an instance of vector data; apply a dimension reduction technique to plural instances of vector data so as to generate two-dimensional map data in which each of the plural instances of vector data is projected two-dimensionally as each of plural plot points; identify unknown data indicating a plot point that is different from a plot point already present on the two-dimensional map data; convert the unknown data into converted spectral data; and output the converted spectral data.

4 Claims, 9 Drawing Sheets

(56) References Cited

U.S. PATENT DOCUMENTS

2020/0334806 A1    10/2020   Hieda et al.
2021/0364355 A1*   11/2021   Ben-Shahar  ............. G01J 3/28

OTHER PUBLICATIONS

Raghav Aggarwal, "Translated Materials Informatics",1st Edition, Japan, NTS Yoshida Takashi, Jun. 1, 2017, pp. 215-229 (17 Pages).
Japanese Office Action dated May 7, 2025 in Application No. 2022-184420.

* cited by examiner

FIG.4

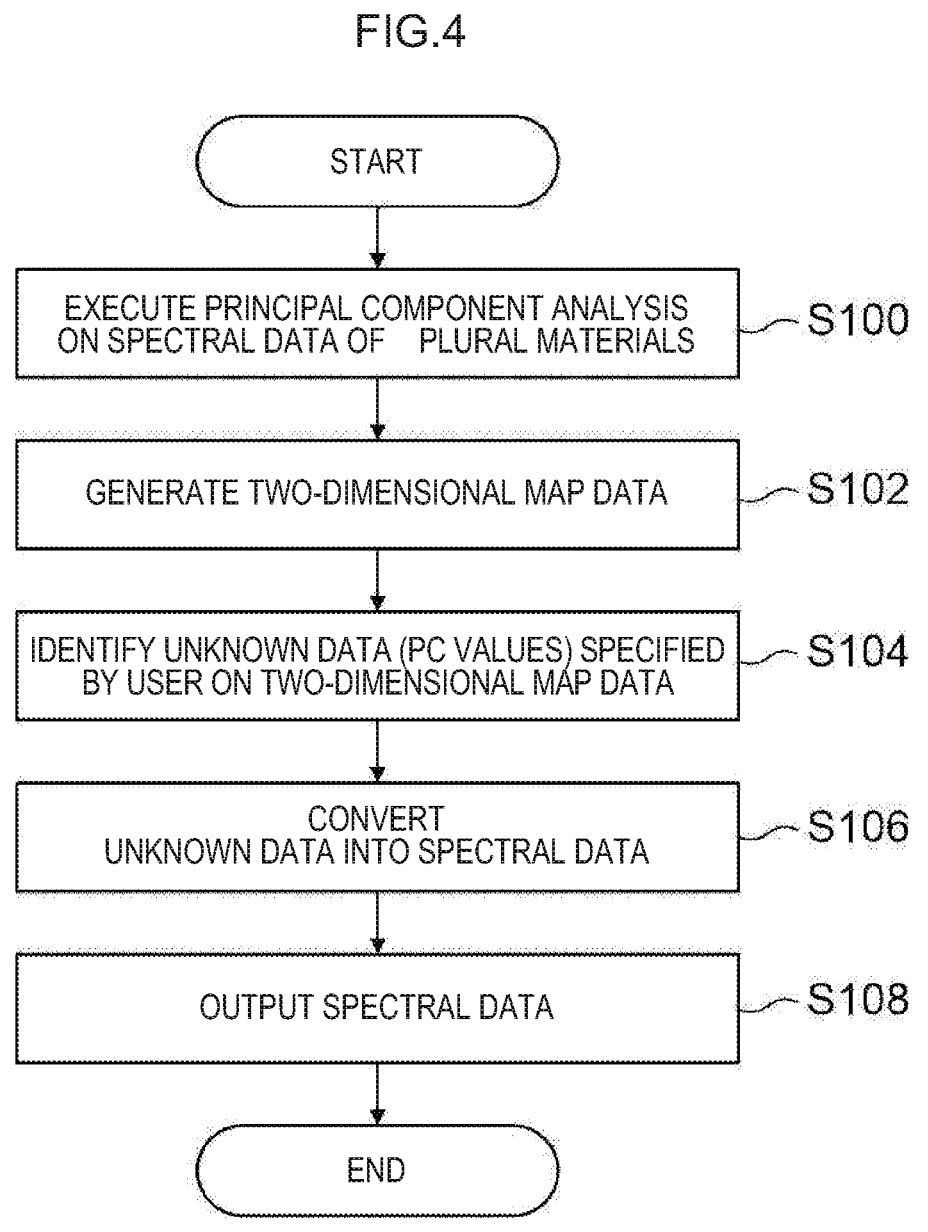

START

EXECUTE PRINCIPAL COMPONENT ANALYSIS
ON SPECTRAL DATA OF    PLURAL MATERIALS ————S100

GENERATE TWO-DIMENSIONAL MAP DATA ————S102

IDENTIFY UNKNOWN DATA (PC VALUES) SPECIFIED
BY USER ON TWO-DIMENSIONAL MAP DATA ————S104

CONVERT
UNKNOWN DATA INTO SPECTRAL DATA ————S106

OUTPUT SPECTRAL DATA ————S108

END

FIG.5

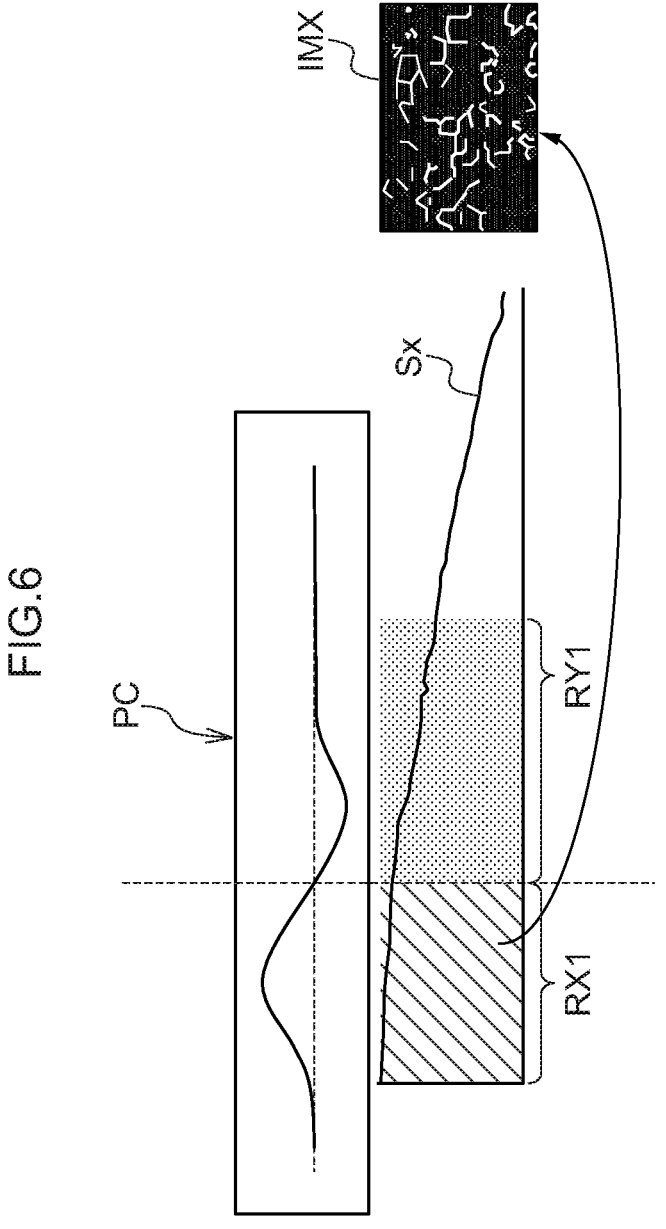

1

INFORMATION PROCESSING DEVICE, INFORMATION PROCESSING METHOD, AND NON-TRANSITORY COMPUTER-READABLE STORAGE MEDIUM FOR MEASURED AND UNKNOWN MATERIAL

CROSS-REFERENCE TO RELATED APPLICATION

This application is based on and claims priority under 35 USC 119 from Japanese Patent Application No. 2022-184420 filed on Nov. 17, 2022, the disclosure of which is incorporated by reference herein.

BACKGROUND

Technical Field

The present disclosure relates to an information processing device, an information processing method, and a non-transitory computer-readable storage medium.

Related Art

For example, Japanese Patent Application Laid-Open (JP-A) No. 2020-176951 discloses an electronic device and a control method therefor which achieve both accuracy and efficiency of analysis when analyzing an object using plural spectral components. This electronic device selects any one of plural parameters generated by machine learning, and uses the selected parameter to analyze spectral data indicating spectral intensities of plural spectral components by receiving light reflected from a food that is the subject of analysis (for example, the Abstract of Japanese Patent Application Laid-Open (JP-A) No. 2020-176951).

In general, when an analysis is performed on a material, the spectral data of the material needs to be measured. In the case of performing an analysis on a material, the measured spectral data is used to perform various analyses on the material.

On the other hand, there are cases in which a user wishes to know, for example, what kind of spectral data a material having performance that the user desires corresponds to. In this case, in a case in which the material having the performance that is desired by the user is unknown and the spectral data thereof has not been measured, the spectral data of the material needs to be acquired by some kind of method.

The electronic device described in Japanese Patent Application Laid-Open (JP-A) No. 2020-176951 selects any one of plural parameters generated by machine learning, and uses the selected parameter to analyze spectral data indicating spectral intensities of plural spectral components by receiving light reflected from a food product that is the subject of analysis.

However, the electronic device described in Japanese Patent Application Laid-Open (JP-A) No. 2020-176951 does not acquire spectral data of a material for which spectral data has not been measured.

SUMMARY

The present disclosure provides an information processing device, an information processing method, and a non-transitory computer-readable storage medium which are capable of generating spectral data of a material for which spectral data has not been measured.

An information processing device according to a first aspect is an information processing device including: a setting section that is configured to set respective spectral data measured from each of plural materials as an instance of vector data; a generating section that is configured to apply a dimension reduction technique to plural instances of vector data so as to generate two-dimensional map data in which each of the plural instances of vector data is projected two-dimensionally as each of plural plot points; an identifying section that is configured to identify unknown data indicating a plot point that is different from a plot point present on the two-dimensional map data; a converting section that is configured to convert the unknown data into converted spectral data; and an output section that is configured to output the converted spectral data.

The information processing device according to the first aspect can generate spectral data of a material for which spectral data has not been measured. Specifically, in a case in which a material having a performance value that is desired by a user is assumed, the spectral data of an unknown material expected to have the performance value can be acquired without actually measuring the spectral data of the unknown material.

The spectral data of the information processing device according to a second aspect is data generated by performing frequency analysis of an image of a material; the converting section is configured to convert the unknown data into the converted spectral data and to generate an image of an unknown material from the converted spectral data; and the output section is configured to output the converted spectral data and the generated image of the unknown material. According to the information processing device of the second aspect, in a case in which a material having a performance value that is desired by a user is assumed, an image of an unknown material expected to have the performance value can be acquired without actually capturing an image of the unknown material. Moreover, the user can recognize what kind of image is an image of a material having a performance value that is desired by the user himself/herself. Note that in the second aspect, plural instances of training data in which spectral data and an image are associated with each other may be prepared, a learned model may be generated based on the plural instances of training data, and an image may be generated using the learned model. In this case, a known machine learning model for generating an image is used as the learned model. The learned model is generated, for example, by learning a machine learning model using a depth learning algorithm.

The unknown data of the information processing device according to the third aspect is data specified by the user on the two-dimensional map data; the converting section is configured to convert the unknown data specified by the user into the converted spectral data; and the output section is configured to cause display of the converted spectral data at a display. The information processing device according to the third aspect enables spectral data of an unknown material corresponding to a plot point designated by a user operation to be acquired.

An information processing method according to a fourth aspect is an information processing method executed by a computer, wherein processing includes: setting respective spectral data measured from each of plural materials as an instance of vector data; applying a dimension reduction technique to plural instances of vector data so as to generate two-dimensional map data in which each of the plural instances of vector data is projected two-dimensionally as each of plural plot points; identifying unknown data indicating a plot point that is different from a plot point present on the two-dimensional map data; converting the unknown data into converted spectral data; and outputting the converted spectral data. The information processing method according to the fourth aspect enables spectral data of a material for which spectral data has not been measured to be generated.

A non-transitory computer-readable storage medium according to a fifth aspect is a non-transitory computer-readable storage medium storing an information processing program that is executable by a processor to perform processing, the processing including: setting respective spectral data measured from each of plural materials as an instance of vector data; applying a dimension reduction technique to plural instances of vector data so as to generate two-dimensional map data in which each of the plural instances of vector data is projected two-dimensionally as each of plural plot points; identifying unknown data indicating a plot point that is different from a plot point present on the two-dimensional map data; converting the unknown data into converted spectral data; and outputting the converted spectral data. The non-transitory computer-readable storage medium according to the fifth aspect enables spectral data of a material for which spectral data has not been measured to be generated.

As described above, the present disclosure exhibits the advantageous effect of enabling spectral data of a material for which spectral data has not been measured to be generated.

BRIEF DESCRIPTION OF THE DRAWINGS

Exemplary embodiments of the present invention will be described in detail based on the following figures, wherein:

FIG. 4 is a flowchart illustrating an example of processing performed by a server according to an exemplary embodiment;

FIG. 5 is a diagram illustrating the generating of an image from spectral data; and FIG. 6 is a diagram illustrating processing to convert a portion of spectral data that is highly correlated with performance into an image.

DETAILED DESCRIPTION

Explanation follows regarding an information processing system according to an exemplary embodiment, with reference to the drawings.

Figure 1:
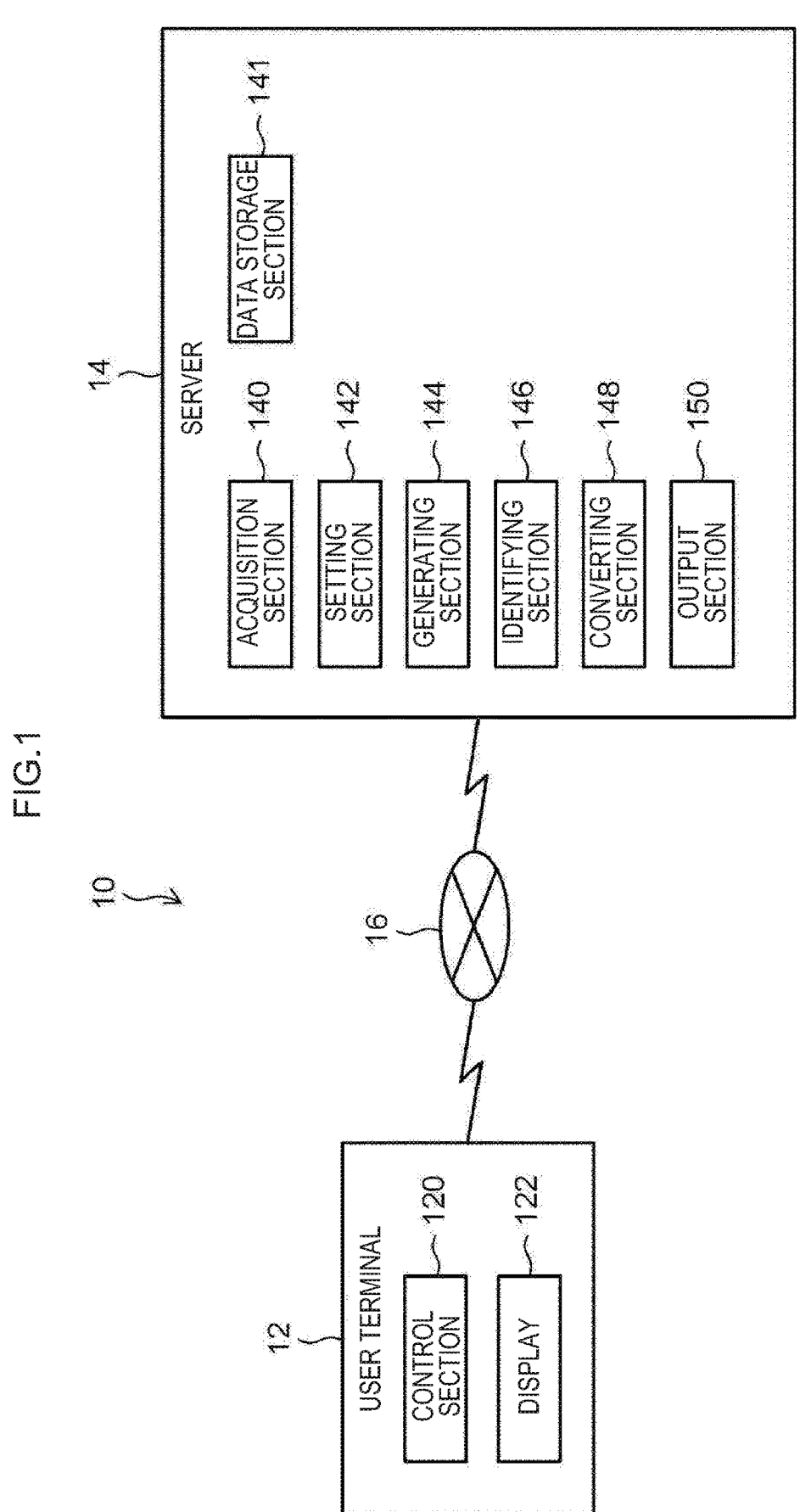
FIG. 1 is a block diagram illustrating an example of a functional configuration of an information processing system 10 according to an exemplary embodiment.

FIG. 1 is a block diagram illustrating an example of a functional configuration of an information processing system 10 according to an exemplary embodiment. As illustrated in FIG. 1, the information processing system 10 includes a user terminal 12 and a server 14, which is an example of an information processing device. The user terminal 12 and the server 14 are connected via a network 16 such as the Internet so as to be capable of communicating with each other.

The information processing system 10 of the present exemplary embodiment projects respective spectral data measured from each of plural materials onto two-dimensional map data. Note that one plot point on the two-dimensional map data corresponds to one instance of spectral data, and one instance of spectral data corresponds to one material. The spectral data is, for example, data measured by various techniques.

Moreover, the information processing system 10 of the present exemplary embodiment converts unknown data, which is a plot point that is different from a plot point already present on the two-dimensional map data and which indicates a plot point designated by the user, into spectral data. This enables spectral data of materials for which spectral data has not been measured to be generated. Detailed explanation follows below.

User Terminal

The user terminal 12 is operated by a user. As illustrated in FIG. 1, functionally, the user terminal 12 includes a control section 120 and a display 122.

The control section 120 controls operation of the user terminal 12. The display 122 displays various information in accordance with the control by the control section 120.

Server

As illustrated in FIG. 1, functionally, the server 14 includes an acquisition section 140, a data storage section 141, a setting section 142, a generating section 144, an identifying section 146, a converting section 148, and an output section 150.

The acquisition section 140 acquires plural instances of spectral data transmitted from the user terminal 12. Further, acquisition section 140 stores the plural instances of spectral data at the data storage section 141.

The data storage section 141 stores respective spectral data measured from each of plural materials.

The setting section 142 sets each of the plural instances of spectral data as an instance of vector data. For example, in a case in which spectral data is illustrated in a graph in which a horizontal axis represents a frequency and a vertical axis represents a spectral value, vector data is set including, as a component, each of the spectral values corresponding to the respective frequencies.

The generating section 144 applies principal component analysis, which is an example of a dimension reduction technique, to plural instances of vector data. Then, based on the result of applying the principal component analysis, the generating section 144 generates two-dimensional map data in which each of the plural instances of vector data is projected two-dimensionally as each of plural plot points. The generating section 144 transmits the two-dimensional map data and the related information to the user terminal 12.

Figure 2A:
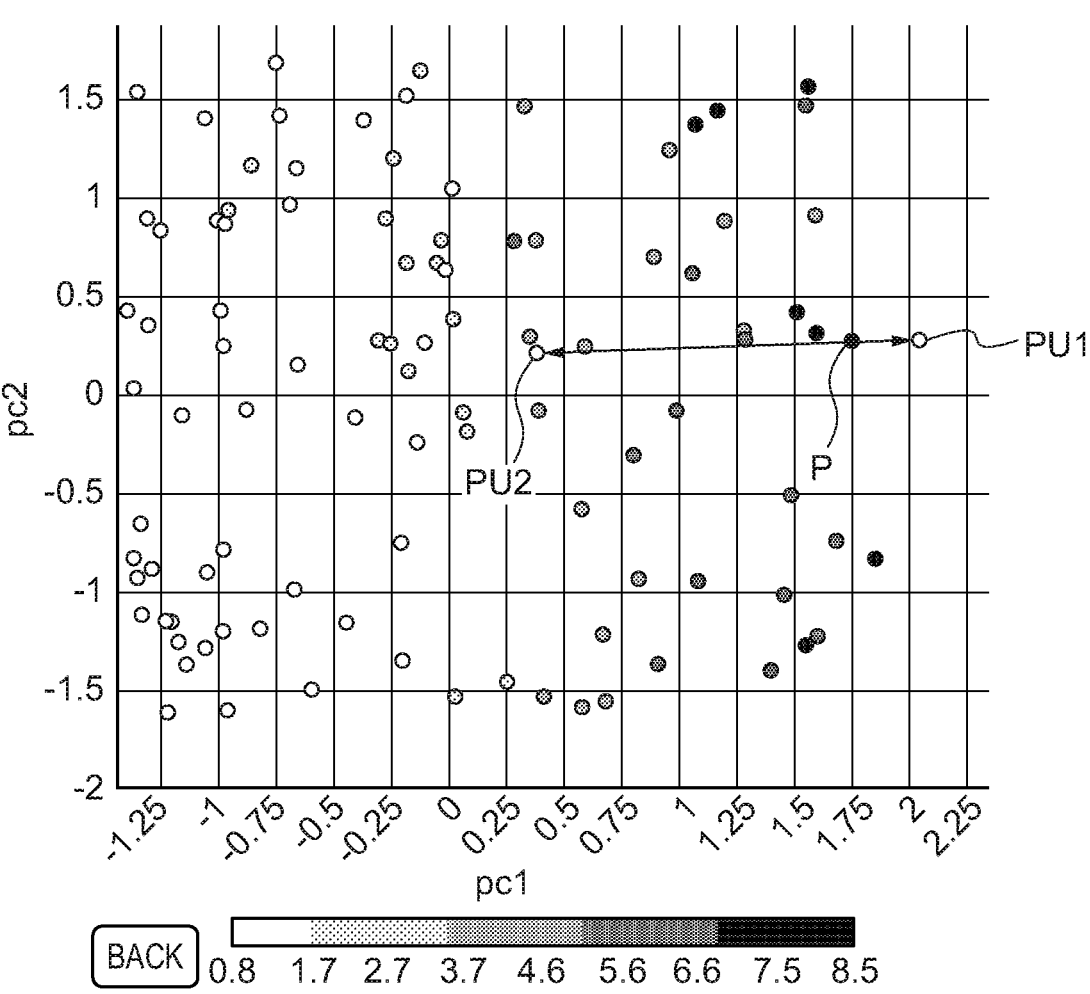
FIG. 2A is a diagram illustrating two-dimensional map data and spectral data.

FIG. 2A to FIG. 2D are diagrams illustrating an example of two-dimensional map data and related information. Related information in FIG. 2A to FIG. 2D includes principal component values (hereinafter also referred to simply as "PC values") displayed in bar format and spectral data corresponding to these principal component values. The user operates his/her own user terminal 12 to cause display of the two-dimensional map data and related information as illustrated in FIG. 2A at the display 122 of the user terminal 12.

The horizontal axis "pc1" of the two-dimensional map data in FIG. 2A indicates the value of the first principal component, and the vertical axis "pc2" indicates the value of the second principal component. One plot point illustrated in FIG. 2A corresponds to one instance of spectral data. Further, as illustrated in FIG. 2A, the color intensity of a plot point indicates the performance of the material corresponding to the plot point. More specifically, in a case in which the color of a plot point is white, this indicates that the performance of the material is poor, and in a case in which the color of a plot point is black, this indicates that the performance of the material is good. Therefore, the more the plot points situated to the right in FIG. 2A, the higher the performance of the material. When the "BACK" button in FIG. 2A is pressed, the screen transitions to another screen.

Figure 2B:
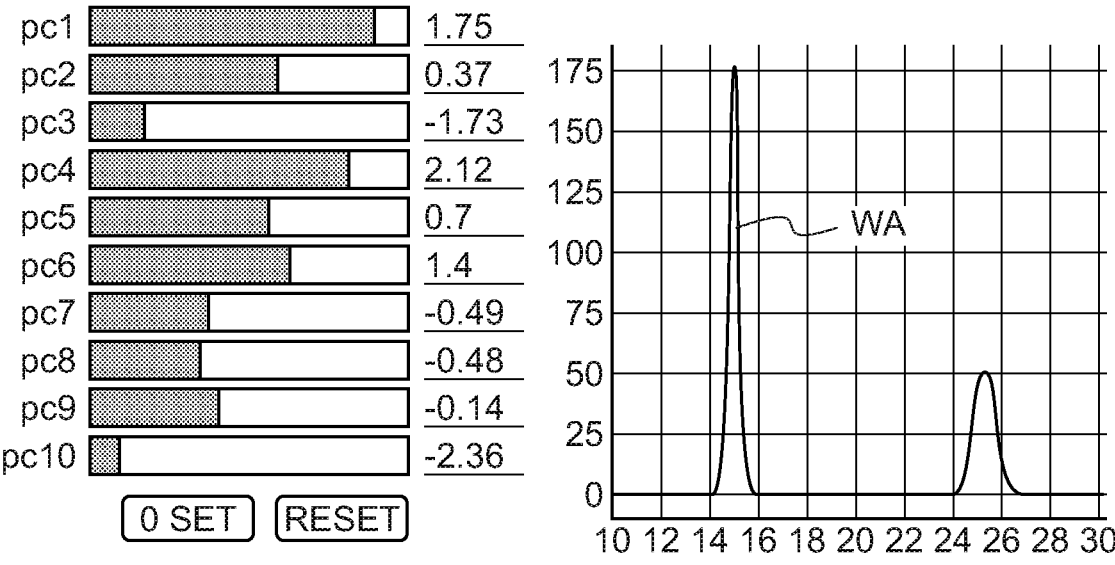
FIG. 2B is a diagram illustrating two-dimensional map data and spectral data.
Figure 2C:
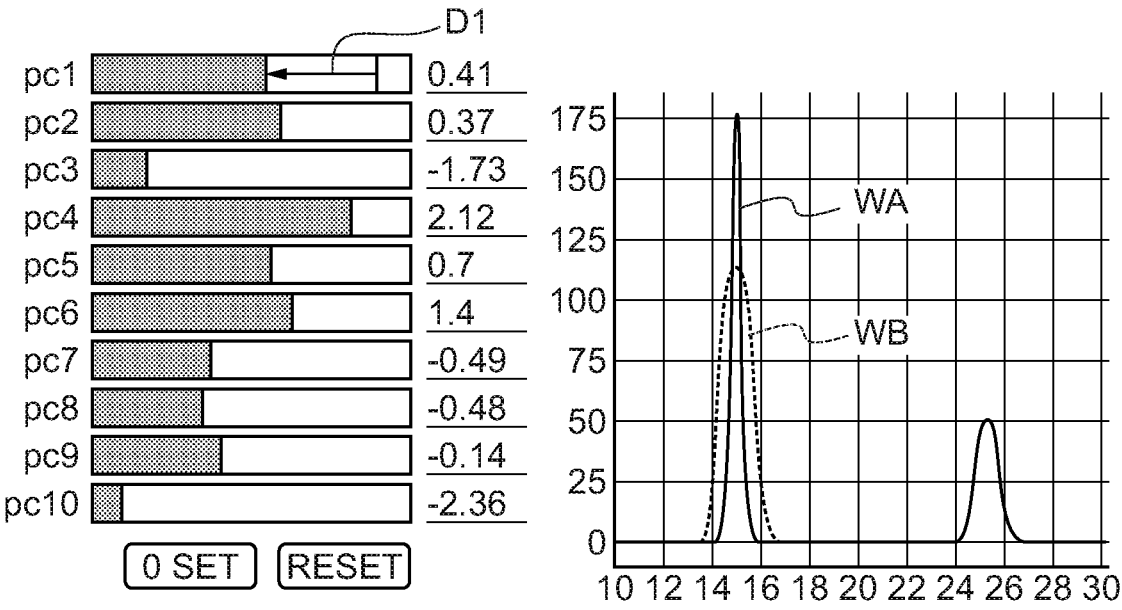
FIG. 2C is a diagram illustrating two-dimensional map data and spectral data.
Figure 2D:
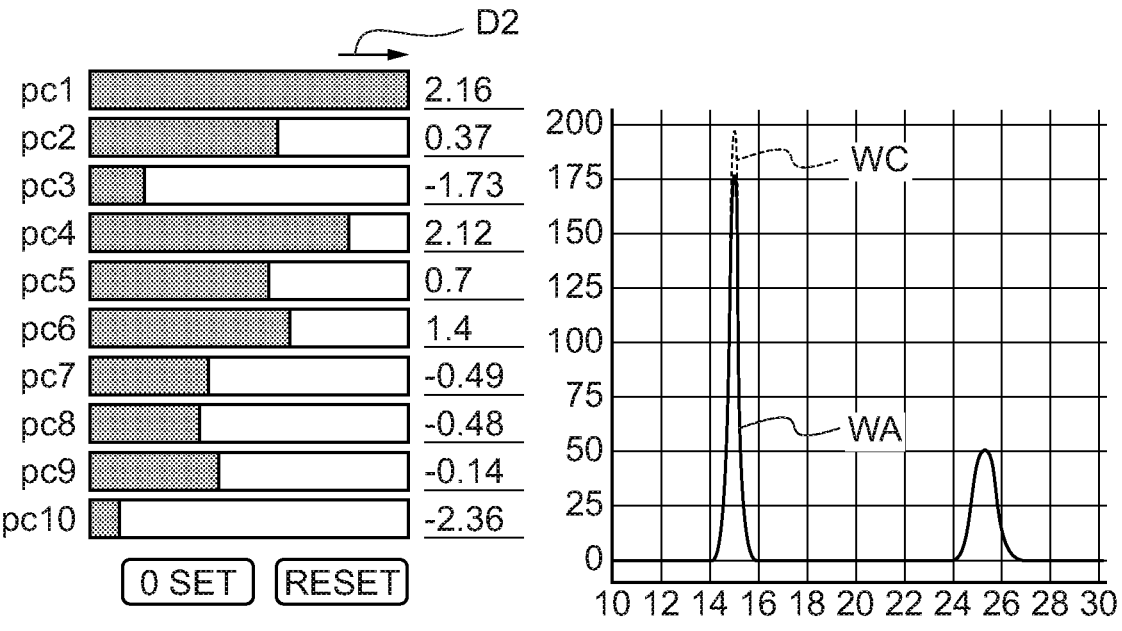
FIG. 2D is a diagram illustrating two-dimensional map data and spectral data.

FIG. 2B to FIG. 2D are diagrams illustrating an example of principal component values displayed in bar format and spectral data corresponding to the principal component values. Ten PC values from pc1 to pc10 are displayed in bar format on the left side of FIG. 2B to FIG. 2D. On the right side of FIG. 2B to FIG. 2D, spectral data corresponding to the PC values on the left side are illustrated. The conversion of PC values to spectral data is uniquely determined. Note that the button "0 SET" illustrated in FIG. 2B to FIG. 2D is a button for setting the ten PC values from pc1 to pc10 to zero. The button "RESET" illustrated in FIG. 2B to FIG. 2D is a button for restoring the ten PC values from the modified pc1 to pc10 to an original state.

On the two-dimensional map data of FIG. 2A, the positions of the respective plots are configured so as to be adjustable. Accordingly, for example, the user operates his/her own user terminal 12 to move the plot point P of the two-dimensional map data illustrated in FIG. 2A on the two-dimensional map data. The user operates his/her own user terminal 12 to move plot points that are already present on the two-dimensional map data, thereby specifying plot points that are different from plot points that are already present. A plot point that is different from an already present plot point is unknown data for which there is no spectral data. Further, the unknown data is also data specified by the user on the two-dimensional map data.

For example, the user moves the plot point P illustrated in FIG. 2A to a plot point PU1 corresponding to unknown spectral data that has not been measured. By the plot point P on the two-dimensional map data being moved to the plot point PU1, the value of pc1 illustrated in FIG. 2B ("1.75" in FIG. 2B) changes to the value of pc1 illustrated in FIG. 2D ("2.16" in FIG. 2D).

Further, for example, the user moves the plot point P illustrated in FIG. 2A to an unknown plot point PU2. By the plot point P on the two-dimensional map data being moved to the plot point PU2, the value of pc1 illustrated in FIG. 2A ("1.75" in FIG. 2A) changes to the value of pc1 illustrated in FIG. 2C ("0.41" in FIG. 2C).

The waveform of the spectral data illustrated on the right side of FIG. 2B to FIG. 2D also changes due to a change in the PC values. Note that the horizontal axis of the graph of spectral data represents, for example, frequency, and the vertical axis represents spectral values. For example, the spectral data WA changes to the spectral data WB illustrated in FIG. 2C due to a change in the value of pc1. Moreover, the spectral data WA changes to the spectral data WC illustrated in FIG. 2D due to a change in the value of pc1.

As described above, the server 14 of the present exemplary embodiment converts unknown data corresponding to a plot point that is different from a plot point already present on the two-dimensional map data (specifically, as described above, a point designated by the user) into spectral data. The server 14 then outputs the converted spectral data, as illustrated on the right side of FIG. 2B to FIG. 2D. This enables spectral data of an unknown material for which spectral data has not been measured to be generated.

For example, as illustrated in FIG. 2A, in a case in which the higher the value of pc1 in the spectral data is, the higher the performance of the material is, the user can check pseudo spectral data of the high-performance material by designating the plot point PU1. Accordingly, if the user specifies a plot point that is expected to be a high-performance material, spectral data corresponding to the plot point is generated, thereby enabling the user to know what the spectrum that realizes the high performance is.

Note that the PC values displayed in bar format as illustrated in FIG. 2A to FIG. 2D may be configured so as to be adjustable. For example, the waveform of the spectral data may be changed by changing the PC values as indicated by the arrows D1 and D2 illustrated in FIG. 2C and FIG. 2D. In this case, the waveform of the spectral data changes in response to changing and adjusting the principal component value (PC value) displayed in bar format, thereby enabling the user to understand the meaning of the principal component value (PC value).

The identifying section 146 identifies unknown data indicating a plot point that is different from a plot point already present on the two-dimensional map data generated by the generating section 144. More specifically, as described above, the identifying section 146 identifies unknown data indicating the plot point that is specified by the user (for example, a PC value corresponding to the plot point).

The converting section 148 converts the unknown data identified by the identifying section 146 into spectral data. Note that conversion from unknown data into spectral data can be implemented using known techniques.

The output section 150 outputs the spectral data converted by the converting section 148 and the respective PC values. The data output from the output section 150 is transmitted to the user terminal 12.

The user operates the user terminal 12 to check information that is displayed at the display 122 of the user terminal 12. For example, the user refers to the two-dimensional map data and the related information as illustrated in FIG. 2A, and checks what shape the spectral data (for example, pseudo spectral data equivalent to a material with high performance) corresponding to the unknown data specified by the user himself/herself is in.

Figure 3:
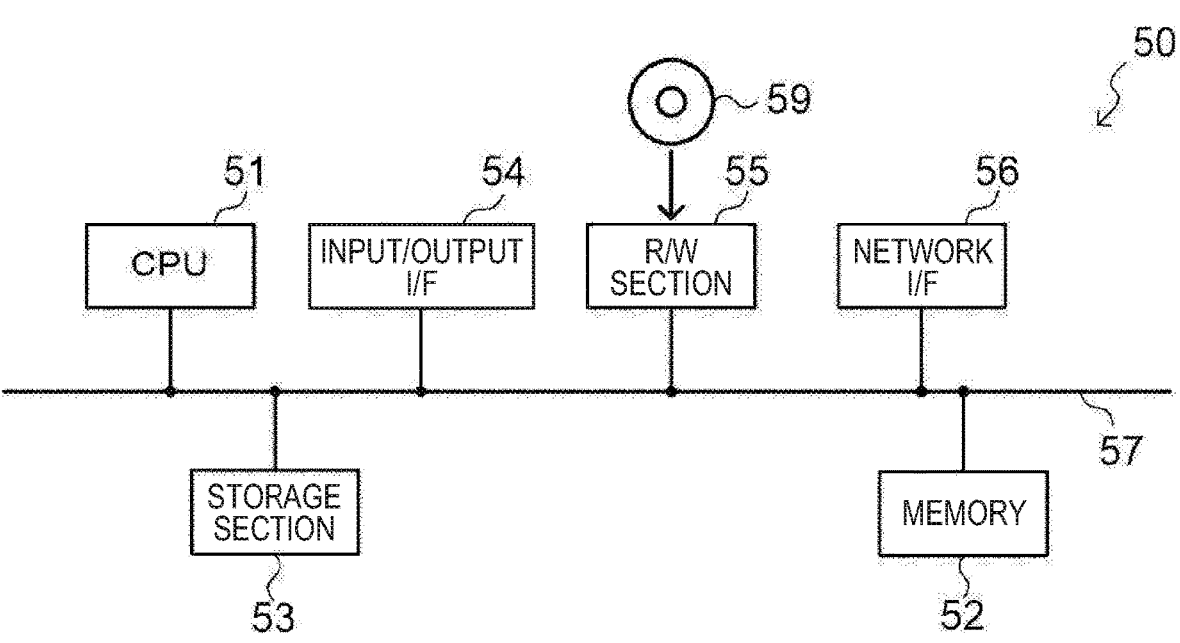
FIG. 3 is a diagram illustrating a configuration example of a computer of a server and a user terminal according to an exemplary embodiment.

The user terminal 12 and the server 14 can be implemented by, for example, a computer 50 as illustrated in FIG. 3. A computer 50 that implements the user terminal 12 and the server 14 includes a CPU 51, a memory 52 serving as a temporary storage area, and a non-volatile storage section 53. Further, the computer 50 includes an input/output interface (I/F) 54 to which an input/output device or the like (not shown) is connected, and a read/write (R/W) section that controls reading and writing of data from and to a recording medium 59. Moreover, the computer includes a network I/F 56 that is connected to a network such as the Internet. The CPU 51, the memory 52, the storage section 53, the input/output I/F 54, the R/W section 55, and the network I/F 56 are connected to each other via a bus 57.

The storage section 53, can be implemented by a hard disk drive (HDD), a solid state drive (SSD), a flash memory, or the like. A program for causing the computer to function is stored at the storage section 53 serving as a non-transitory computer-readable storage medium. The CPU 51 serving as a processor reads the program from the storage section 53, loads the program in the memory 52, and sequentially executes the processes included in the program.

Next, explanation follows regarding operation of the information processing system 10 of the exemplary embodiment.

For example, a user inputs plural instances of spectral data, which is data acquired by executing predetermined measurement processing on plural materials, to the user terminal 12 operated by the user himself/herself.

The control section 120 of the user terminal 12 receives plural instances of spectral data according to the operation by the user. The control section 120 then transmits the plural instances of spectral data to the server 14 in response to the operation performed by the user.

When the plural instances of spectral data are transmitted from the user terminal 12 to the server 14, the acquisition section 140 of the server 14 acquires the plural instances of spectral data transmitted from the user terminal 12. Further, the acquisition section 140 stores the plural instances of spectral data at the data storage section 141.

When the server 14 receives a predetermined instruction signal transmitted from the user terminal 12, the information processing routine illustrated in FIG. 4 is executed.

At step S100, the setting section 142 of the server 14 reads each of the plural instances of spectral data stored at the data storage section 141, and sets each of the plural instances of spectral data as an instance of vector data.

At step S102, the generating section 144 of the server 14 applies principal component analysis, which is an example of a dimension reduction technique, to plural instances of vector data. Then, based on the result of applying the principal component analysis, the generating section 144 of the server 14 generates two-dimensional map data in which each of the plural instances of vector data is two-dimensionally projected as each of the plural plot points. The generating section 144 of the server 14 transmits the two-dimensional map data and the related information as illustrated in FIG. 2A to the user terminal 12.

The control section 120 of the user terminal 12 receives the two-dimensional map data and the related information transmitted from the user terminal 12 at step S102. The user operates his/her own user terminal 12 to cause display of the two-dimensional map data and related information illustrated in FIG. 2A at the display 122. The user then operates his/her own user terminal 12 to move plot points that are already present on the two-dimensional map data, thereby specifying plot points that are different from the plot points that are already present. A plot point that is different from an already present plot point is unknown data for which there is no spectral data. The unknown data specified by the user is transmitted from the user terminal 12 to the server 14.

At step S104, the identifying section 146 of the server 14 identifies the unknown data transmitted from the user terminal 12. More specifically, as described above, the identifying section 146 identifies unknown data indicating the plot point that is specified by the user (for example, a PC value corresponding to the plot point).

At step S106, the converting section 148 of the server 14 converts the unknown data identified at step S104 into spectral data.

At step S108, the output section 150 of the server 14 transmits the spectral data of the unknown data acquired at step S106 and other information (for example, the two-dimensional map data as illustrated in FIG. 2A and the PC values in bar format at the left of FIG. 2B to FIG. 2D) to the user terminal 12.

The user operating the user terminal 12 checks the data output from the server 14 to confirm what the spectral data of the material that he/she wishes to use is.

As described above, the server of the information processing system according to the exemplary embodiment sets respective spectral data measured from each of plural materials as an instance of vector data. The server applies a dimension reduction technique to plural instances of vector data to generate two-dimensional map data in which each of the plural instances of vector data is projected two-dimensionally as each of plural plot points. The server identifies unknown data indicating plot points that are different from plot points that are already present on the two-dimensional map data. The server converts the unknown data into spectral data. The server then outputs the converted spectral data. This enables spectral data of a materials for which spectral data has not been measured to be generated. Specifically, in a case in which a material having a performance value that is desired by a user is assumed, the spectral data of the unknown material expected to have the performance value can be acquired without actually measuring the spectral data of the unknown material. Further, the user can recognize what kind of data is the spectral data of a material having a performance value that is desired by the user himself/herself. Moreover, it is possible to acquire spectral data of an unknown material corresponding to a plot point that is designated by a user operation.

Further, although explanation has been given regarding the information processing performed by the computer 50 according to each of the above-described exemplary embodiments as software processing performed by the CPU 51 executing a program, there is no limitation thereto. For example, processing may be performed using hardware such as a graphics processing unit (GPU), an application specific integrated circuit (ASIC), or a field-programmable gate array (FPGA). Alternatively, both software and hardware may be combined in processing. Moreover, in a case in which software processing is used, the program may be stored and distributed on various non-transitory computer-readable storage medium.

Further, the present disclosure is not limited to the above descriptions, and obviously various other modifications may the implemented within a range that does not depart from the gist of the present disclosure.

For example, the spectral data of the above-described exemplary embodiments may be spectral data generated from an image of a material. For example, the spectral data may be data generated by performing frequency analysis of an image acquired by capturing an image of a material using an electron microscope or the like. In this case, the converting section 148 of the server 14 of the information processing system 10 converts the unknown data into spectral data, and generates an image of the unknown material from the converted spectral data. The output section 150 then outputs the converted spectral data and an image of the generated material.

Figure 5:
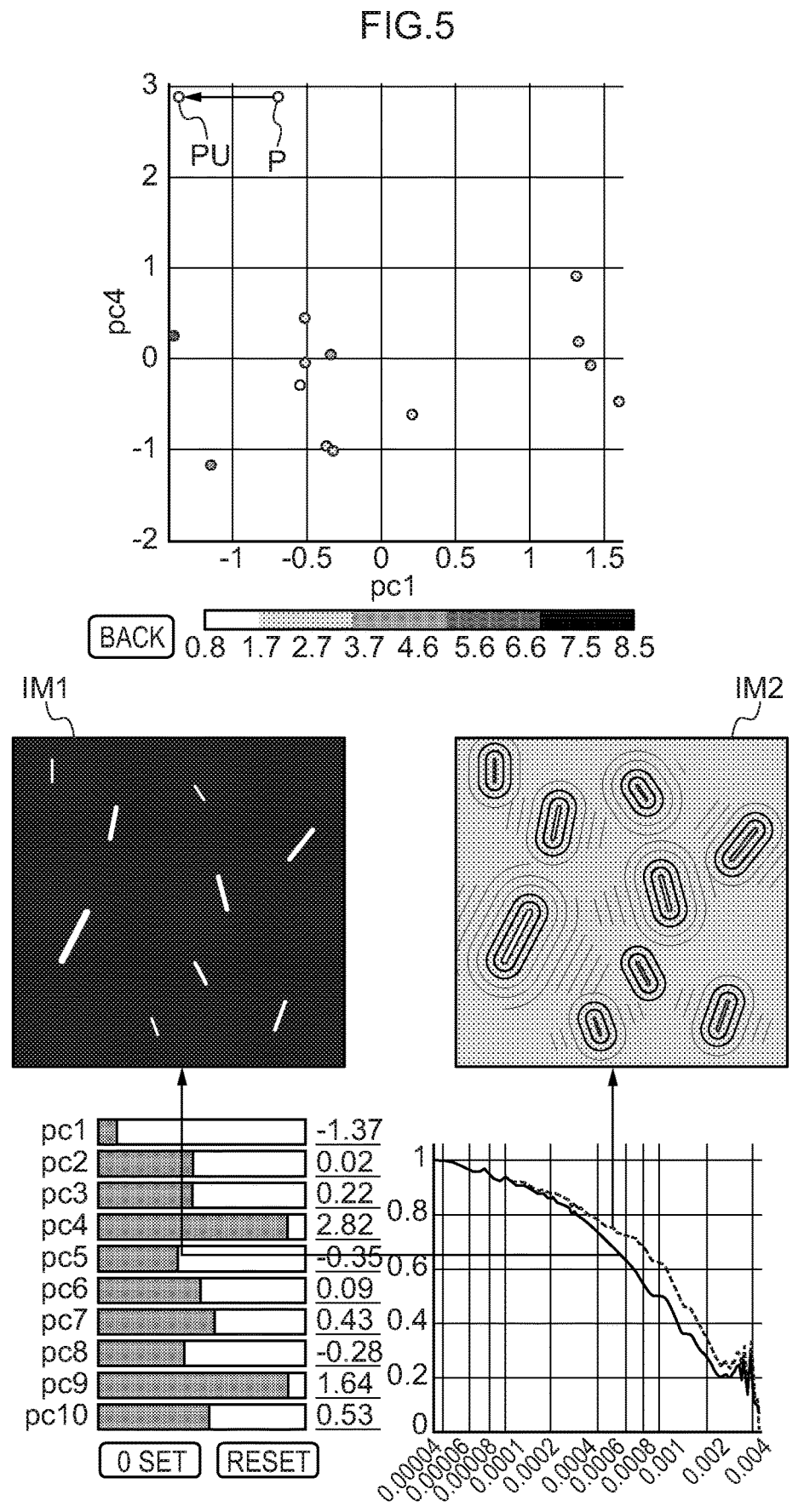

FIG. 5 is a diagram illustrating an example of a case in which an image of an unknown material is generated from converted spectral data. As illustrated at the upper part of FIG. 5, consider a case in which the user moves a plot point P that is already present on the two-dimensional map data to a plot point PU corresponding to unknown data. In this case, the spectral data generated from the image IM1 of the material for which an image has actually been captured corresponds to the plot point P, while the unknown data for which an image has not been captured corresponds to the plot point PU. The image IM1 illustrated in the middle part of FIG. 5 is an image of a material for which an image has actually been captured, and the image IM2 is an image of an unknown material. The image IM2 is an example of an image that is generated by the converting section 148 of the server 14 of the information processing system 10.

The left side of the lower part of FIG. 5 illustrates PC values in bar format, while the right side of the lower part of FIG. 5 illustrates spectral data (the solid line in FIG. 5) generated from an actual image IM and spectral data (the dashed line in FIG. 5) corresponding to unknown data. The horizontal axis of the graph of spectral data represents, for example, frequency, and the vertical axis represents spectral values.

In this case, the server 14 of the information processing system 10 identifies the plot point PU corresponding to the unknown data, and calculates the spectral data (the dashed line in FIG. 5) corresponding to the unknown data. As described above, the conversion of the PC value corresponding to the unknown data into the spectral data can be uniquely determined. On the other hand, conversion of the spectral data into the unknown image IM2 is not uniquely determined.

Accordingly, when executing conversion processing of converting spectral data into an image, the server 14 of the information processing system 10 randomly generates plural image candidates based on the image IM1, for example, and selects image candidates from among the image candidates that are close to the spectral data. For example, the server 14 generates plural image candidates by randomly changing pixel values configuring the image IM1 that corresponds to the plot point P that is specified by the user. The server 14 then generates spectral data for each of the plural image candidates by performing frequency analysis with respect to each of the plural image candidates. The server 14 then selects an image candidate with a small difference (or less than or equal to a threshold) between the spectral data for each of the plural image candidates and the spectral data corresponding to the plot point PU that corresponds to the unknown data, as the image IM2 corresponding to the unknown data.

Alternatively, for example, the server 14 of the information processing system 10 may prepare plural instances of training data in which spectral data and an image are associated with each other, generate a learned model based on the plural instances of training data, and generate an image using the learned model. In this case, the solid-line spectral data and the image IM1 illustrated in FIG. 5 are set in advance as training data. Moreover, for example, a known machine learning model for generating an image is used as the learned model. The learned model is generated, for example, by learning a machine learning model using a depth learning algorithm. For example, the server 14 of the information processing system 10 inputs the dashed-line spectral data illustrated in FIG. 5 into the learned model, thereby generating the image IM2 corresponding to the unknown spectral data.

Accordingly, in a case in which a material having a performance value desired by a user is assumed, an image of the unknown material expected to have the performance value can be acquired without actually capturing an image of the unknown material. Moreover, the user can recognize what kind of image is an image of a material having a performance value that is desired by the user himself/herself. Further, generating an image from the spectral data also enables the user to understand the relationship between the PC value of the spectral data and the image.

Note that as illustrated in FIG. 6, for example, only the portions of the spectral data that have a correlation with the performance of the material may be converted into an image. For example, consider a case in which the PC value obtained by the principal component analysis of FIG. 6 has a positive correlation with a certain performance of a material. For example, only a partial region RX1 of the spectral data Sx corresponding to a portion having a high value from among the respective PC values configuring the high-dimensional vector data may be converted into the image IMX. Alternatively, only the partial region RY1 of the spectral data Sx corresponding to a portion having a low value from among the respective PC values configuring the high-dimensional vector data may be converted into an image. Generating an image from a portion of the spectral data also enables the user to understand the relationship between the portion of the spectral data and the image. This enables the user to understand what kind of image would achieve the desired performance.

Alternatively, the output section 150 may cause the values of the respective dimensions corresponding to the unknown data (for example, PC values for principal component analysis) to be displayed in bar format, and the converting section 148 may convert the PC values into spectral data in response to a user operation (for example, a bar operation) on the values of the respective dimensions displayed in the bar format (for example, PC values for principal component analysis). This enables the spectral data of the unknown material to be displayed in response to a user operation on the respective dimensional values (for example, PC values for principal component analysis) of the dimensional compression results displayed at the display 122 of the user terminal 12. Moreover, the user can understand the meaning of the values of the respective dimensions (for example, PC values for principal component analysis) of the dimensional compression results.

Further, the converting section 148 may generate spectral data corresponding to an average of plot points already present in the two-dimensional map data in response to a user operation (for example, a bar operation), and the output section 150 may output the spectral data corresponding to the average. This enables the average of the plural instances of spectral data already displayed in the two-dimensional map data to be displayed in response to a user operation.

Moreover, the converting section 148 may perform regression analysis between performance values (such as mechanical strength, surface reflectance, and transparency) of the material and values of each dimension (such as PC values of the principal component analysis) obtained by applying principal component analysis, which is an example of a dimension reduction technique. In this case, the output section 150 may further output the regression analysis result obtained by the converting section 148. This enables the regression analysis result of the performance value of the material and the value of each dimension (such as the PC value of the principal component analysis) of the dimensional compression result to be obtained.

Alternatively, a color (such as red as the higher the performance value, or the like) corresponding to a performance value (such as mechanical strength, surface reflectance, transparency, or the like) of the material may be added to each of the plot points on the two-dimensional map data. The color corresponding to the performance value of the material is added to the plot point, thereby enabling the user to acquire spectral data of the material of the desired performance value by himself/herself by designating the plot point using the color as a clue.

What is claimed is:
1. An information processing device comprising:
   a memory; and a processor coupled to the memory, wherein the processor is configured to:

set respective spectral data measured from each of a plurality of materials as an instance of vector data;

apply a dimension reduction technique to a plurality of instances of vector data so as to generate two-dimensional map data in which each of the plurality of instances of vector data is projected two-dimensionally as each of a plurality of plot points;

identify unknown data indicating a plot point that is different from a plot point present on the two-dimensional map data;

convert the unknown data into converted spectral data; and output the converted spectral data, wherein the spectral data is data generated by performing frequency analysis of an image of a material, and wherein the processor is configured to convert the unknown data into the converted spectral data, to generate an image of an unmeasured material from the converted spectral data, and to output the converted spectral data and the generated image of the unmeasured material.

2. The information processing device according to claim 1, wherein:

the unknown data is data specified by the user on the two-dimensional map; and the processor is configured to convert the unknown data specified by the user into the converted spectral data, and cause display of the converted spectral data at a display.

3. An information processing method of performing processing, by a processor, the processing comprising:

setting respective spectral data measured from each of a plurality of materials as an instance of vector data;

applying a dimension reduction technique to a plurality of instances of vector data so as to generate two-dimensional map data in which each of the plurality of instances of vector data is projected two-dimensionally as each of a plurality of plot points;

identifying unknown data indicating a plot point that is different from a plot point present on the two-dimensional map data;

converting the unknown data into converted spectral data; and outputting the converted spectral data, wherein the spectral data is data generated by performing frequency analysis of an image of a material, and wherein the process further comprises converting the unknown data into the converted spectral data, generating an image of an unmeasured material from the converted spectral data, and outputting the converted spectral data and the generated image of the unmeasured material.

4. A non-transitory computer-readable storage medium storing an information processing program that is executable by a processor to perform processing, the processing comprising:

setting respective spectral data measured from each of a plurality of materials as an instance of vector data;

applying a dimension reduction technique to a plurality of instances of vector data so as to generate two-dimensional map data in which each of the plurality of instances of vector data is projected two-dimensionally as each of a plurality of plot points;

identifying unknown data indicating a plot point that is different from a plot point present on the two-dimensional map data;

converting the unknown data into converted spectral data; and outputting the converted spectral data, wherein the spectral data is data generated by performing frequency analysis of an image of a material, and wherein the process further comprises converting the unknown data into the converted spectral data, generating an image of an unmeasured material from the converted spectral data, and outputting the converted spectral data and the generated image of the unmeasured material.

* * * * *